(12) United States Patent  
Horton

(10) Patent No.: US 7,594,432 B1  
(45) Date of Patent: Sep. 29, 2009

(54) APPARATUS AND METHOD FOR DETERMINING VALVE RECESSION

(75) Inventor: Jeffrey B. Horton, Oklahoma City, OK (US)

(73) Assignee: Kams, Inc., Oklahoma City, OK (US)

(*) Notice: Subject to any disclaimer, the term of this patent is extended or adjusted under 35 U.S.C. 154(b) by 60 days.

(21) Appl. No.: 11/799,668

(22) Filed: May 1, 2007

Related U.S. Application Data

(60) Provisional application No. 60/848,747, filed on Oct. 2, 2006.

(51) Int. Cl.  
*G01M 15/02* (2006.01)

(52) U.S. Cl. ...................... 73/114.79; 33/611

(58) Field of Classification Search .............. 73/114.77, 73/114.79, 115.01, 116.02; 33/600, 606, 33/611  
See application file for complete search history.

(56) References Cited

U.S. PATENT DOCUMENTS

| | | | |
|---|---|---|---|
| 3,638,486 A * | 2/1972 | Lambert ...................... | 73/161 |
| 3,811,194 A * | 5/1974 | Swift et al. ................... | 33/611 |
| 4,458,422 A | 7/1984 | Nishikata et al. | |
| 4,474,059 A * | 10/1984 | Hoeptner, III ............ | 73/114.79 |
| 4,503,619 A | 3/1985 | Nelsen et al. | |
| 4,864,731 A | 9/1989 | Kile et al. | |
| 5,077,909 A * | 1/1992 | Cranor ......................... | 33/607 |
| 5,421,206 A * | 6/1995 | Rohwedder .................. | 73/834 |
| 5,829,928 A | 11/1998 | Harmand et al. | |
| 6,590,387 B2 * | 7/2003 | Miller .................... | 324/207.13 |
| 6,883,245 B1 | 4/2005 | Jirele | |
| 6,966,539 B2 | 11/2005 | Ucman | |
| 7,104,121 B2 * | 9/2006 | Firmin et al. ............ | 73/114.79 |

OTHER PUBLICATIONS

Figs. 13 and 14 of present U.S. Appl. No. 11/799,668, filed May 1, 2007.

\* cited by examiner

*Primary Examiner*—Eric S McCall  
(74) *Attorney, Agent, or Firm*—McAfee & Taft

(57) ABSTRACT

The current invention relates generally to a valve recession measuring tool and method for using the same. The valve recession measurement is based upon a measured height of a surface on a portion of the valve relative to a reference plane. The invention operates without requiring the removal of any of the valve rocker arms.

25 Claims, 10 Drawing Sheets

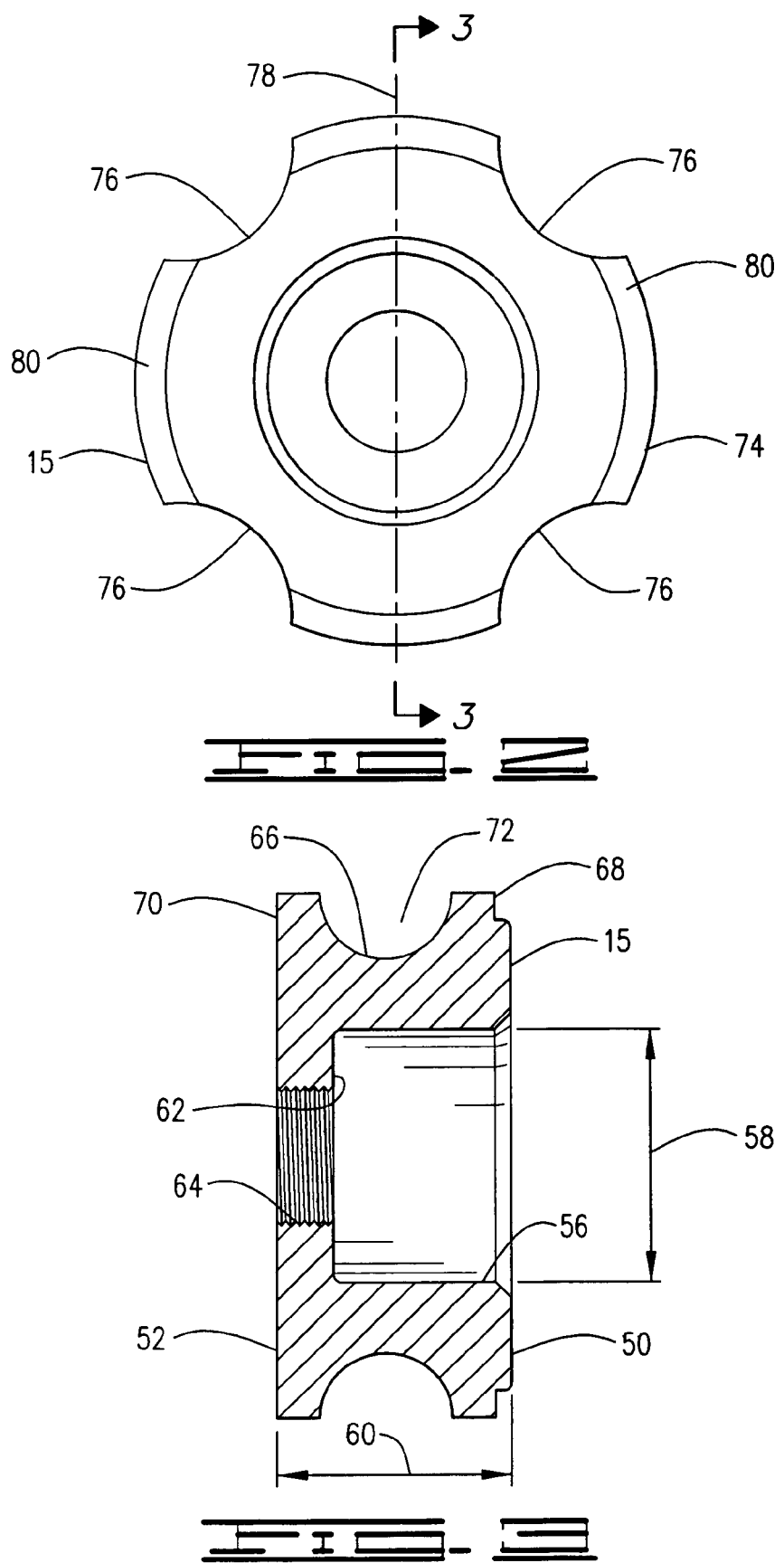

APPARATUS AND METHOD FOR DETERMINING VALVE RECESSION

CROSS REFERENCE TO RELATED APPLICATION

This application claims the benefit under Title 35, United States Code, § 119(e) of U.S. Provisional Application Ser. No. 60/848,747 filed Oct. 2, 2006.

BACKGROUND

Tools for measuring the height of a valve relative to a reference plane or surface are sometimes used to determine how far a valve has recessed into a cylinder head. The amount of recession may be an indication of cylinder head life, so that the cylinder head can be replaced before a damaging failure occurs.

Such tools may be referred to as valve height measuring tools or valve recession measuring tools. Typically, an initial measurement will be taken to determine the relative distance between a point on the valve in the cylinder head and another surface. For a number of valve head configurations, known existing tools require that the cylinder head cover and valve rocker arms be removed to expose the valves and to expose a surface of the cylinder head upon which the tool may be placed. Measurements will be taken at periodic intervals, and the difference between the measurements represents valve recession. Each time a measurement is taken, the cylinder head covers and the valve rocker arm assemblies must be removed. In addition to the time required to remove the rocker arms, time must be spent readjusting the rocker arms, which occurs each time the rocker arms are removed and replaced.

SUMMARY

A valve height measuring tool, which may also be referred to as a valve recession measuring tool, has a center hub defining a reference plane. A measuring assembly, which includes a measuring device, is rotatably mounted to the center hub and will measure the height of valves in a cylinder head relative to the reference plane. The measuring device may be rotated relative to the hub and move along the reference plane from one valve to the next valve until a measurement for all valves in the cylinder head is taken.

The valve height measuring tool has a bushing rotatable relative to the center hub, and to the reference plane defined thereon. The bushing is disposed in a cylindrical well defined in the center hub. The measuring device is preferably connected to the bushing and is rotatable therewith. A stem is connected to the center hub in a bottom thereof.

Valve recession is determined by measuring valve height or valve distance relative to the reference plane at periodic intervals, and calculating the height change which corresponds to the valve recession in the cylinder head. Prior to taking any measurements, the cylinder head cover is removed and the valve height measuring tool is placed in the measuring position on the cylinder head. The valve height measuring tool is a self-positioning tool, in that it will fit on the cylinder head only in the measuring position. The measuring device will contact the reference plane, and is "zeroed" on the reference plane. The reference plane has cutouts through which the valves extend. The measuring device is moved to engage the valve on a surface thereof, for example, on a valve spring retainer surface, and the height, or distance is measured. Because the reference plane is a constant, measurements can be taken relative to the same surface with accuracy. Measurements are taken at periodic intervals and a comparison of the measured distances discloses the valve recession.

BRIEF DESCRIPTION OF THE DRAWINGS

FIG. 2—Is a top view of an embodiment of the hub.
FIG. 3—Is a view from line 3-3 of FIG. 2.
FIG. 8—Is a perspective view of the valve recession measuring tool.

DETAILED DESCRIPTION

Figure 13:
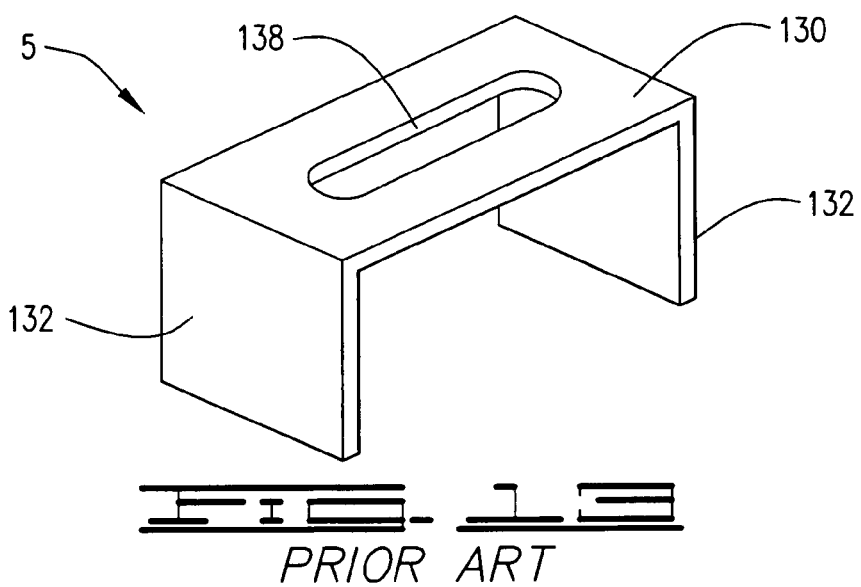
FIG. 13—Is an example of a prior art tool used to determine valve recession.
Figure 14:
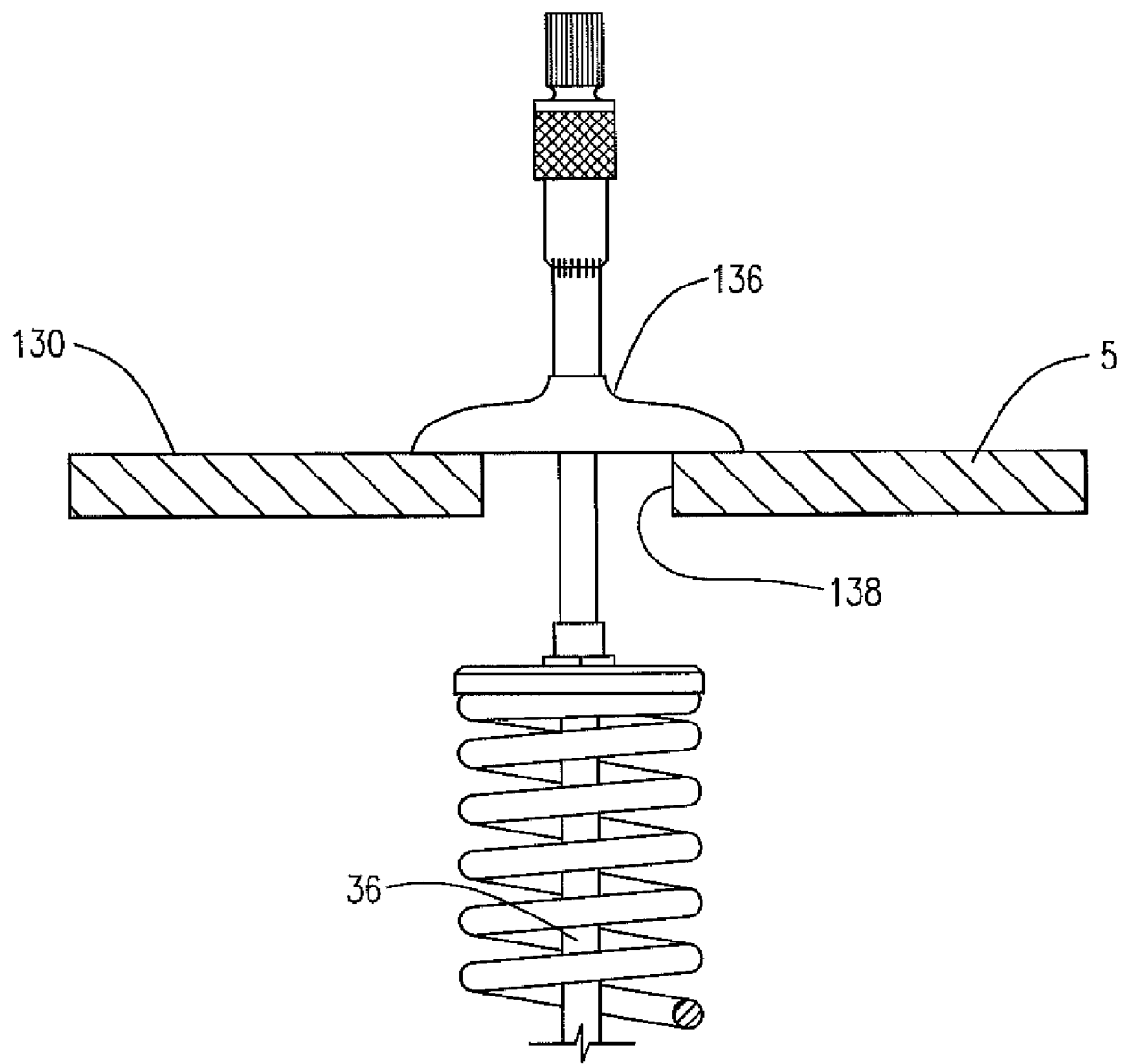
FIG. 14—Shows the prior art tool measuring valve height.

FIGS. 13 and 14 depict an example of a prior art measuring platform 5 which requires removal of the rocker assemblies associated with valves in a cylinder head prior to measuring a height of a valve relative to the platform. Repetitive measurements are taken to determine a height change which corresponds to valve recession in the cylinder head but the cylinder head cover, along with the rocker arm assemblies must be removed any time a measurement is taken.

Valve recession measuring tool 10, which may also be referred to as a valve height measuring tool 10, will measure valve height relative to a reference plane without the necessity of removing the valve rocker assemblies associated therewith. Valve recession in a cylinder head, which is a parameter that may be utilized to predict cylinder head life, can thus be determined without removing rocker arm assemblies.

Figure 11:
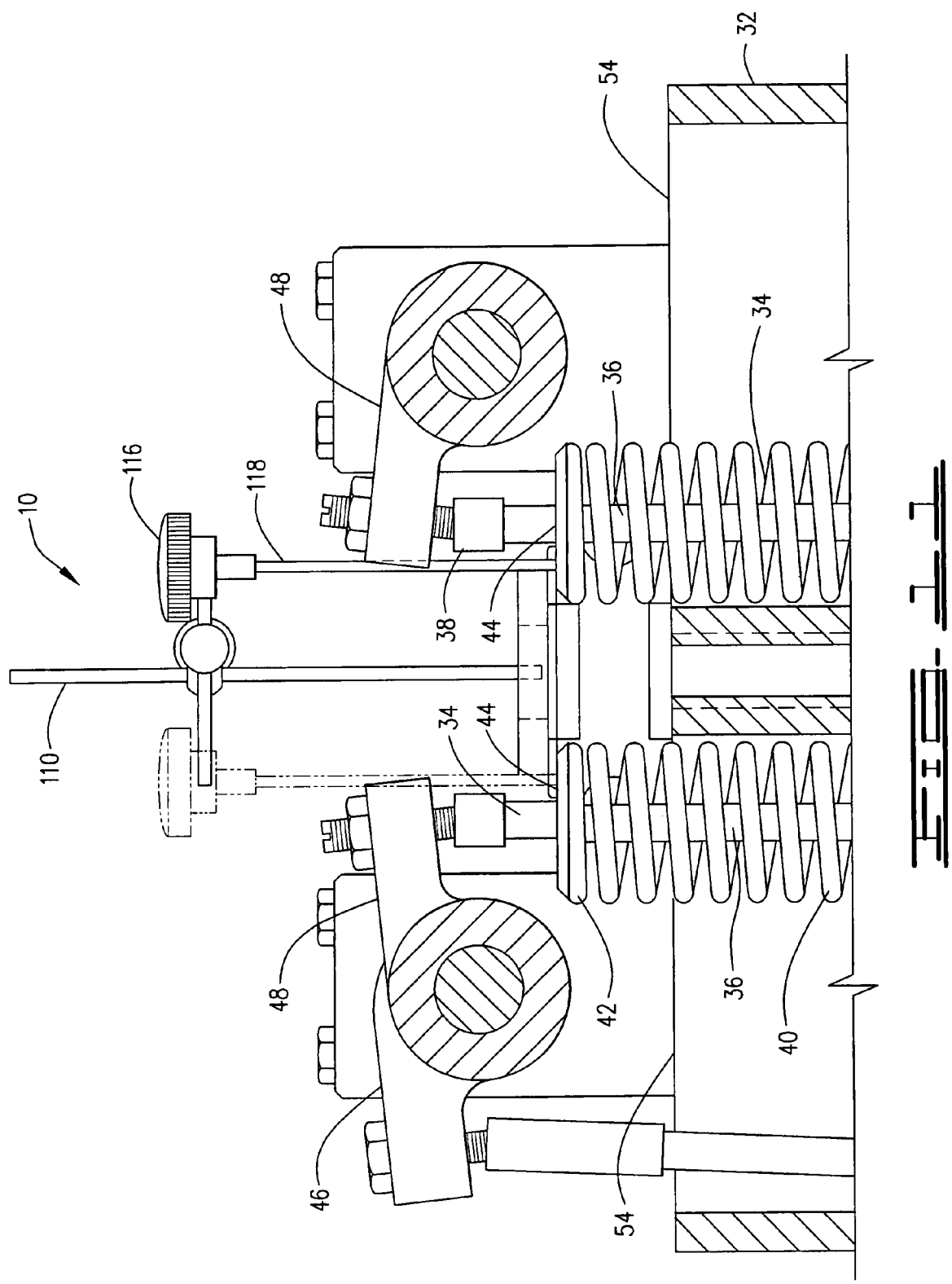
FIG. 11—Is a view from line 11-11 of FIG. 10.
Figure 12:
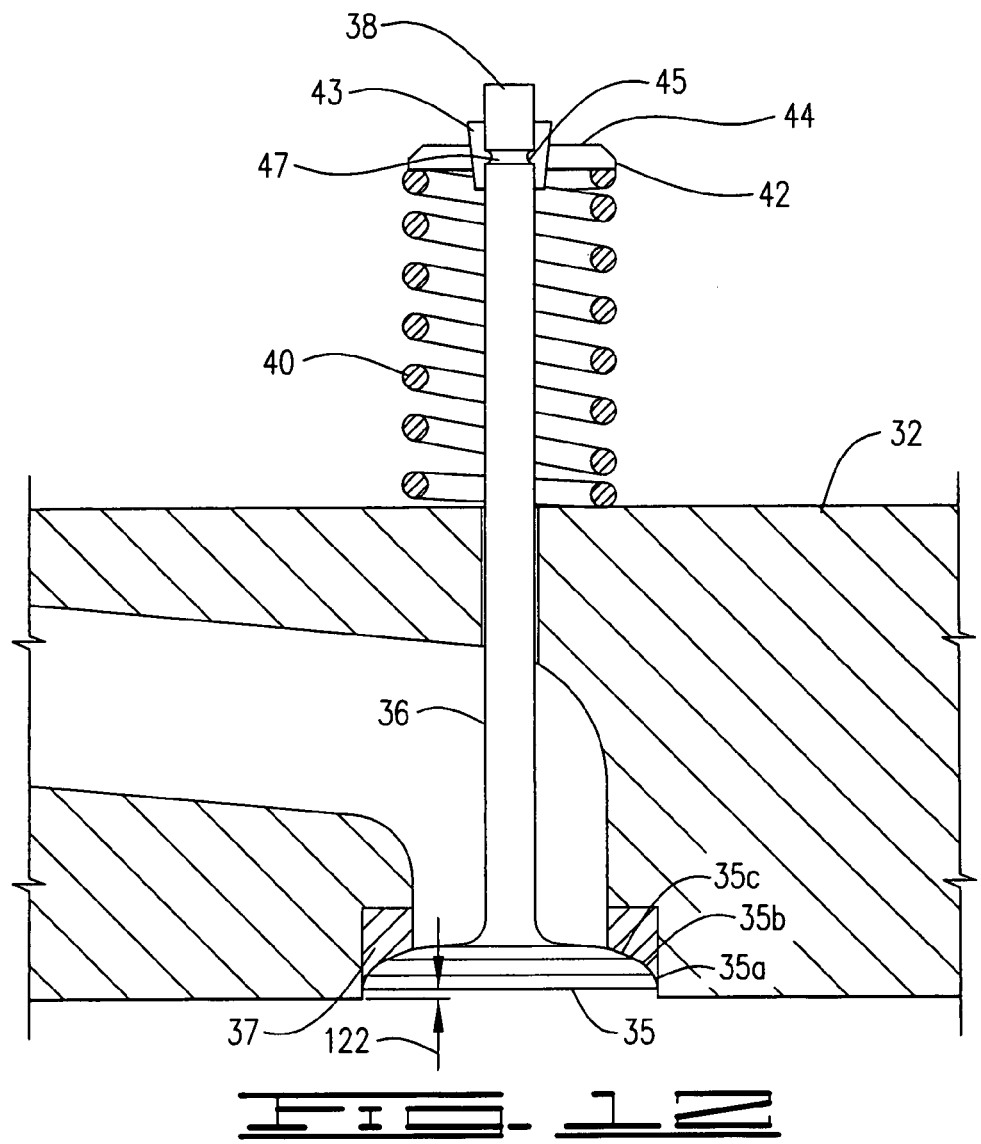
FIG. 12—Is a section view showing a valve extending through a cylinder head.

Valve recession measuring tool 10 comprises hub 15, bushing 20, and stem 25. Bushing 20 is rotatable relative to hub 15, and stem 25 is connected to hub 15, and may be, for example, threaded to hub 15. A measuring assembly 30 is connected to bushing 20. Valve recession tool 10 is shown in a measuring position in FIGS. 10 and 11 on a cylinder head 32, with the cylinder head cover removed. Cylinder head 32 is of a type that might be used, for example, in a 6, 12 or 16 cylinder engine, that would require 6, 12 or 16 cylinder heads. Each cylinder head 32 in the described embodiment has four valves 34 with a valve head 35, which is shown in FIG. 12. Valve head 35 may have a plurality of portions, for example, 35a, 35b and 35c, each of which has a slightly different angle from vertical at the outer surface thereof. A valve seat 37 is fixed in cylinder head 32, and may be pressed into cylinder head 32. Seat 37 may be machined to match the angles on valve head 35. Each valve 34 comprises a valve stem 36 extending from valve head 35 and has a valve end 38. A valve spring 40 is disposed about valve stem 36, and a valve spring retainer 42 is fixed to valve stem 36 to hold valve spring 40 in place. Valve spring retainer 42 has a valve spring retainer surface 44. A split lock ring, or split bushing 43 is disposed about valve stem 36 and has a ridge 45 thereon that extends into a groove 47 on valve stem 36. Valve spring retainer 42 fits around the tapered outer surface of split bushing 43, and the force applied by valve spring 40 uses split bushing 43 to close around valve stem 36 and valve spring retainer 42 is held in place by split bushing 43.

Cylinder head 32 includes rocker arm assemblies 46. Each rocker arm assembly 46 has a pair of rocker arms 48, each of which in operation will normally be in contact with its corresponding valve end 38. Cylinder head 32 also includes a spark plug 49 in a spark plug well. When cylinder head 32 is operating in an engine, valve 34 will move so that valve head 35 reciprocates out of contact and back into contact with valve seat 37. Valve head 35 will repetitively engage and disengage valve seat 37, and will do so with sufficient force such that over time valve seat 37 will wear, causing valve recession into valve seat 37.

Referring back to FIGS. 1, 2, and 3, hub 15 has a top surface 50 and a bottom surface 52. When measuring tool 10 is in its measuring position, bottom surface 52 will engage a cylinder head surface 54. Hub 15 defines a cylindrical inner well 56 with diameter 58. Cylindrical inner well 56 extends from top surface 50 downwardly a portion of the way through thickness 60 of hub 15 which is defined by top and bottom surfaces 50 and 52 thereof. Inner well 56 has bottom 62. An opening 64, which is preferably a threaded opening 64, extends from bottom 62 of cylindrical well 56 to bottom surface 52 of hub 15.

A semi-circular, or U-shaped groove 66 defined in hub 15 defines upper and lower rims 68 and 70, respectively, with a space 72 extending therebetween. Center hub 15 has a periphery 74, that may be a circular periphery 74, with arcuate cutouts 76 therein. A center line 78 bisects hub 15 when it is placed in its measuring position, which may be referred to as a 0° and 180° position when measuring tool 10 is mounted on cylinder head 32. As will be explained in more detail, hub 15 is an automatically positioning or self-positioning hub, since it can only be placed in the 0° or 180° position, which is the proper measuring position.

Hub 15 defines a reference plane or reference surface 80, which may be, for example, a recessed ledge at the periphery 74 of hub 15. Reference plane 80 is not continuous, and is interrupted by cutouts 76. Reference plane 80 establishes a reference surface for taking measurements, and provides for accurately taking repeatable, consistent measurements of valve height relative thereto.

Figure 1:
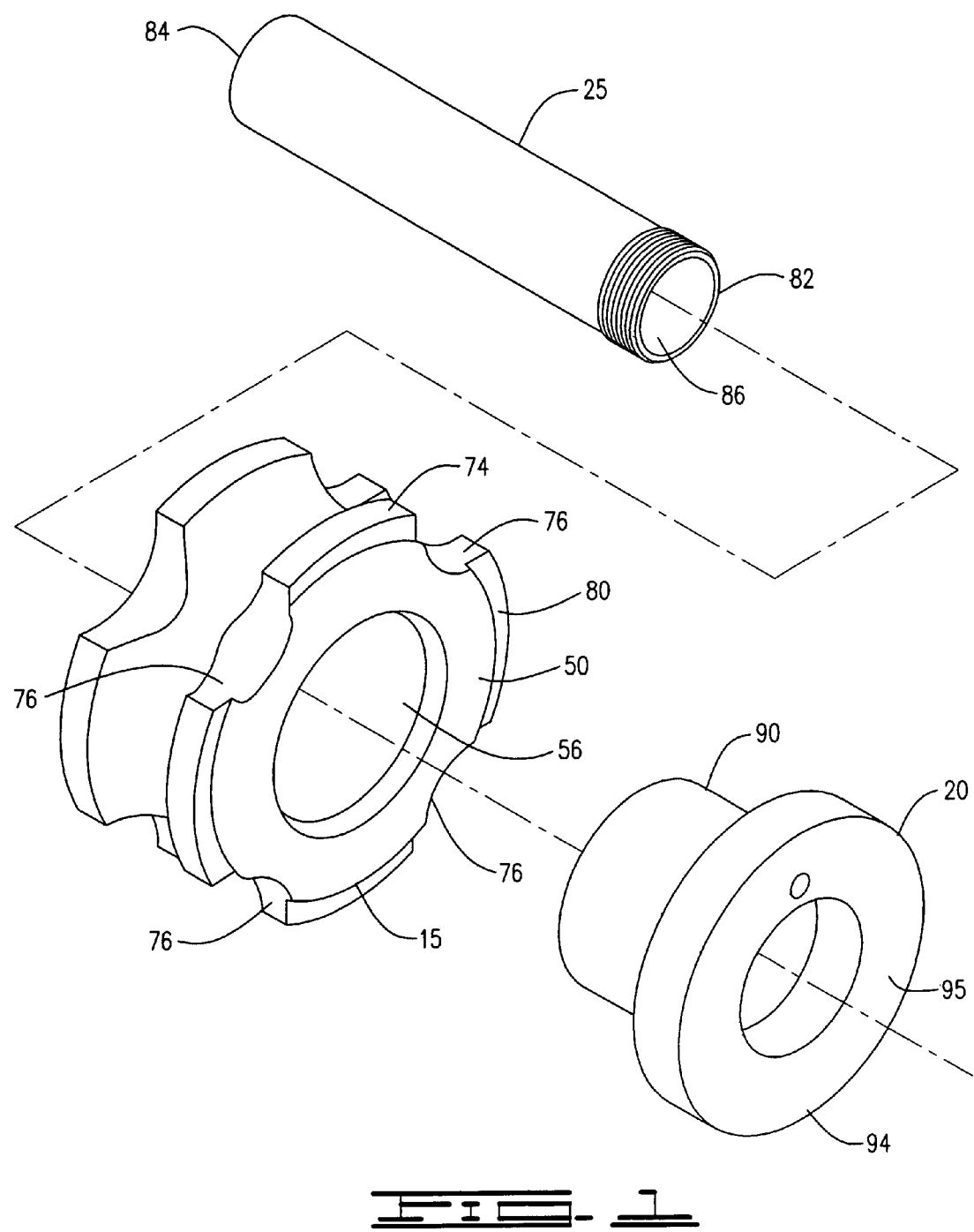
FIG. 1—Is an exploded perspective view of the hub, bushing and stem of the valve recession measuring tool.
Figure 4:
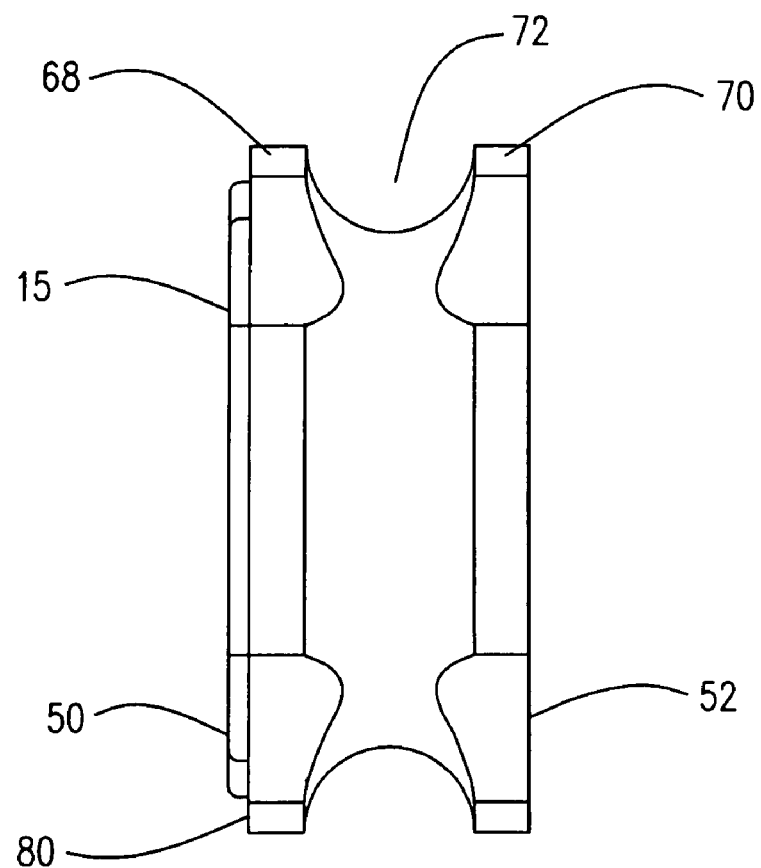
FIG. 4—Is a side view of the hub.
Figure 5:
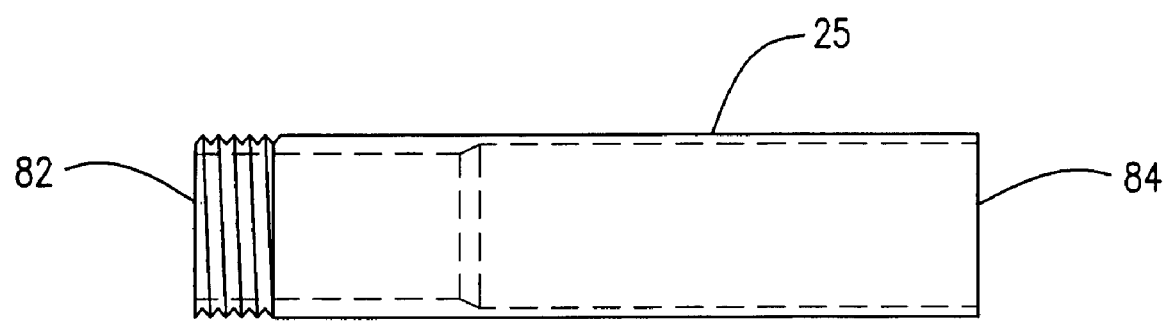
FIG. 5—Is a side view of a stem of the valve recession measuring tool.
Figure 6:
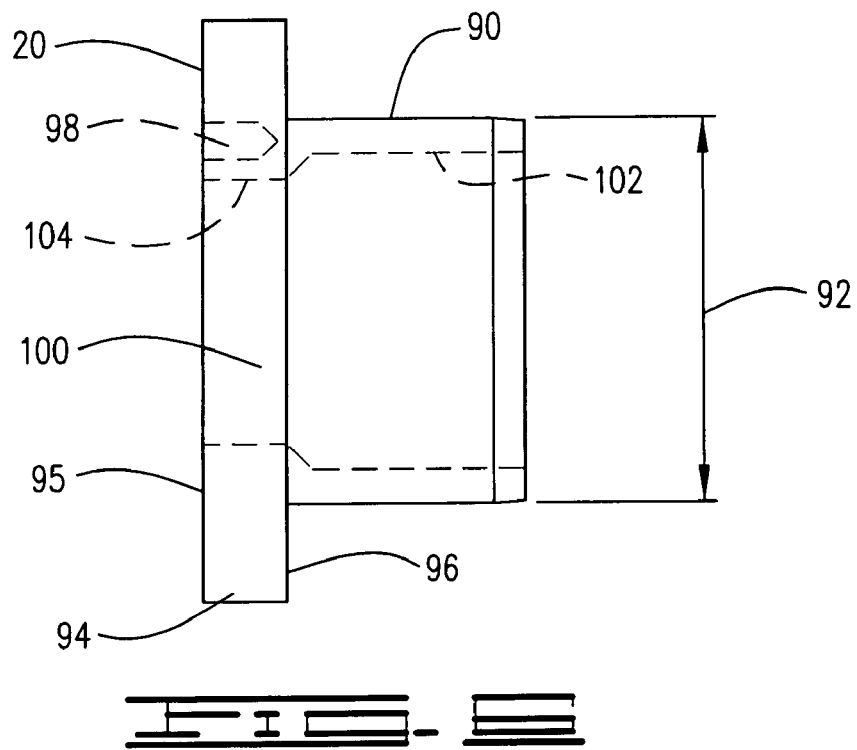
FIG. 6—Is a side view of a rotatable bushing.
Figure 7:
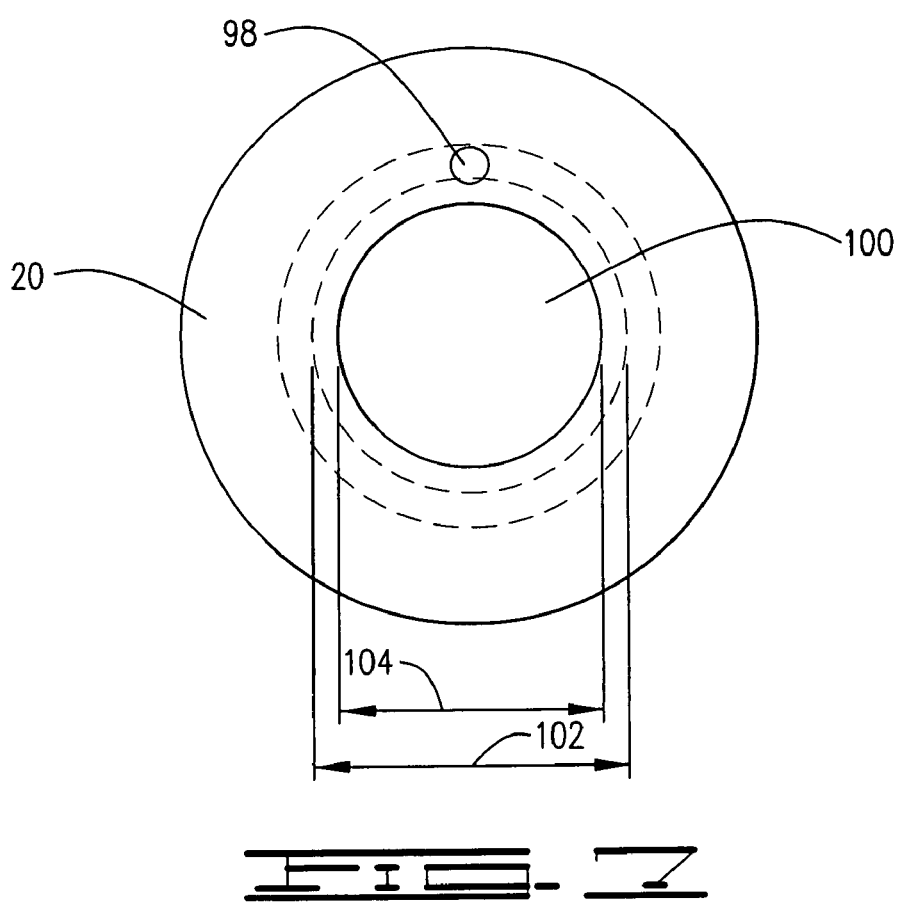
FIG. 7—Is a top view of a rotatable bushing.
Figure 5:
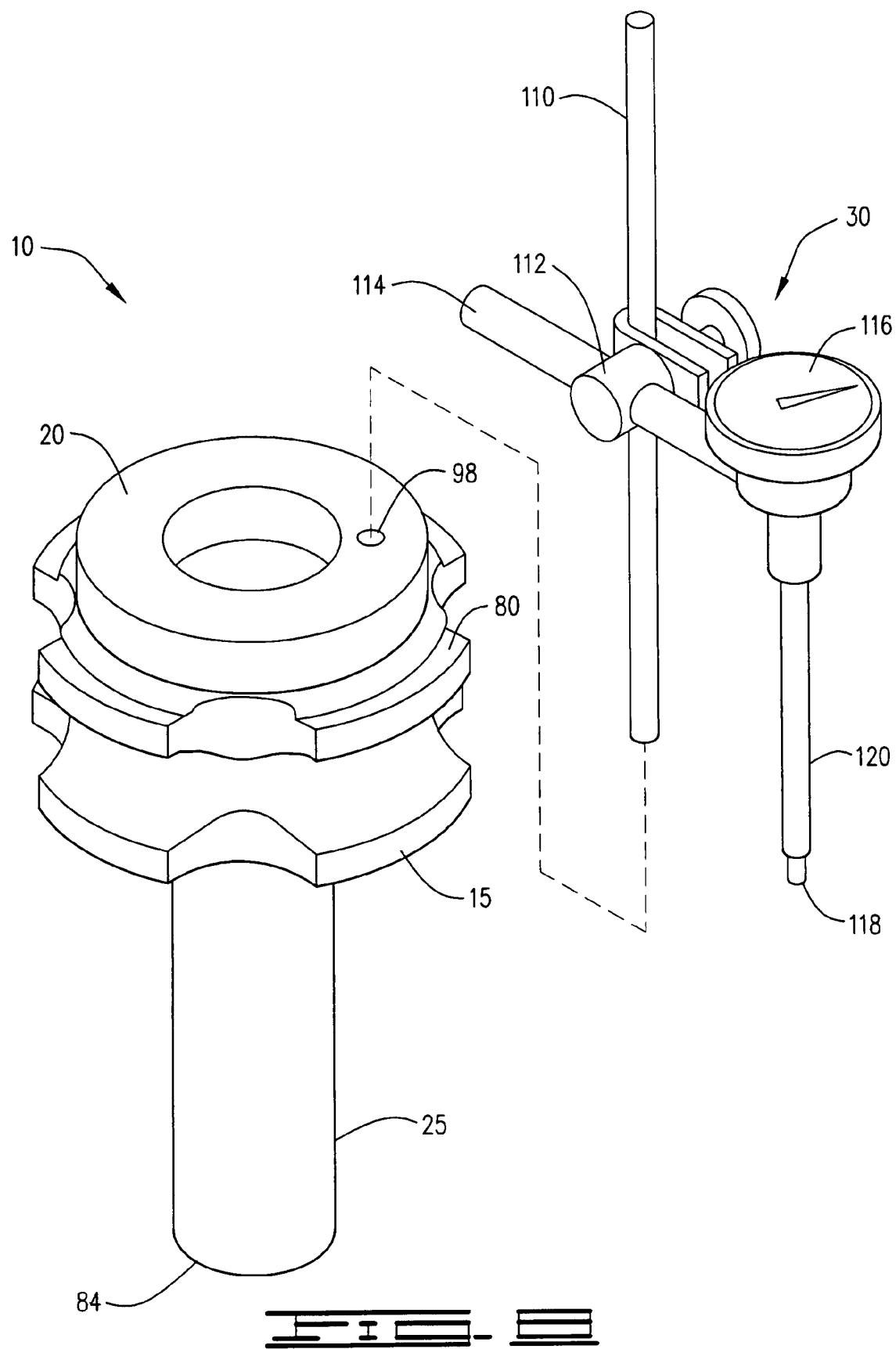
Figure 9:
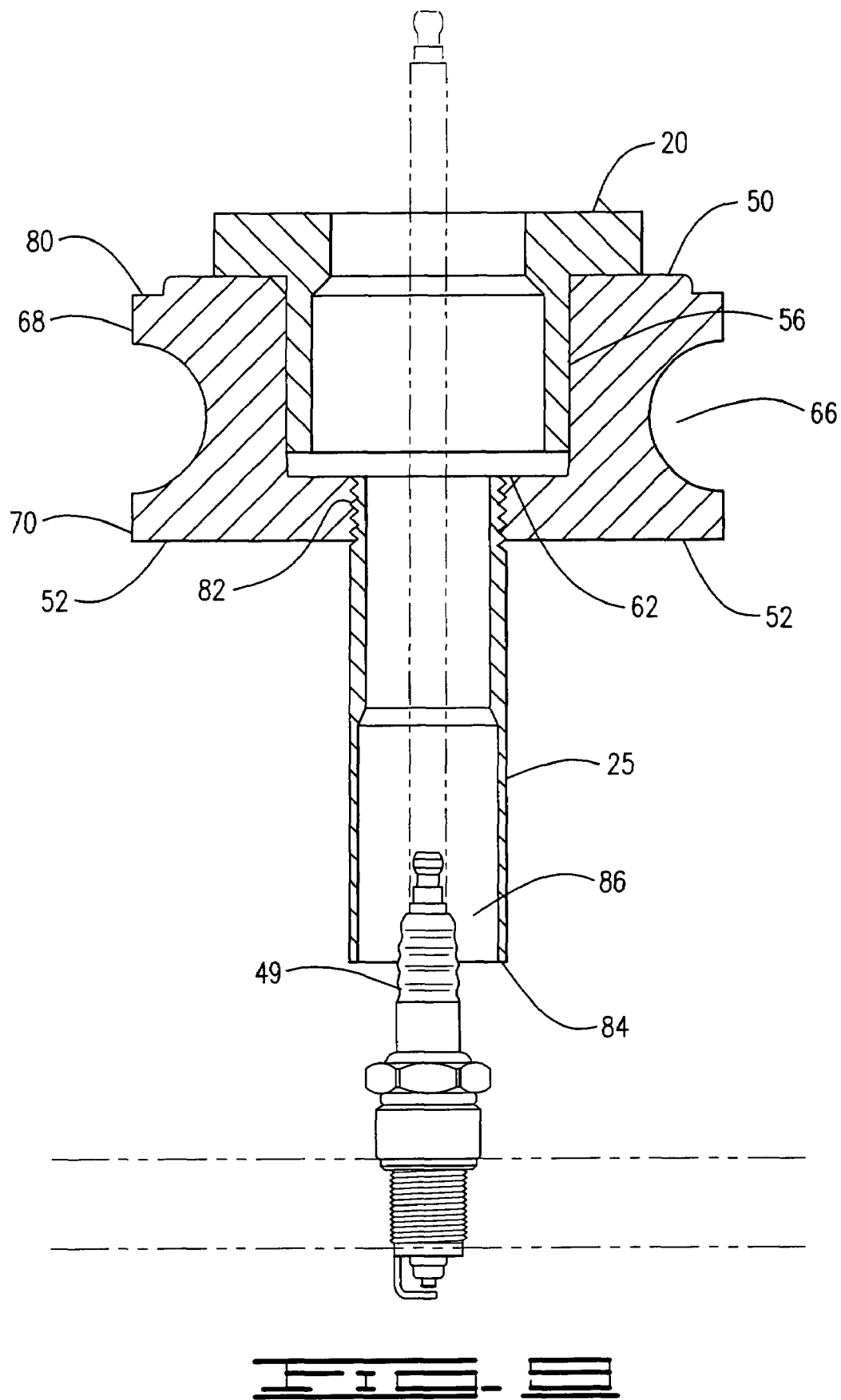
FIG. 9—Is a cross-sectional view of the hub, the bushing and the stem of the valve recession measuring tool.

Referring to FIG. 1, stem 25 has first or upper end 82 and second or lower end 84. Stem 25 is threaded at the upper end 82 thereof for threaded connection to hub 15 at threaded opening 64. Stem 25 has central opening 86, and is adapted to circumscribe spark plug 49 in cylinder head 32.

Bushing 20 has a bushing outer surface 90 with outer diameter 92. A shoulder 94 has upper and lower surfaces 95 and 96 and extends radially outwardly from diameter 92. A mounting point opening 98, which is a threaded opening 98, may be defined in top surface 95 of shoulder 94. Measuring assembly 30 is connected, for example, by threading to bushing 20 at mounting point 98. Bushing 20 has central opening 100 with first and second diameters 102 and 104, wherein diameter 104 is smaller than diameter 102. When valve height measuring tool 10 is assembled, bushing 20 is slidably disposed in cylindrical inner well 56 of hub 15, and is rotatable relative to hub 15. Measuring assembly 30, which is attached to bushing 20, is likewise rotatable relative to hub 15, and to reference plane 80.

Referring now to FIG. 8, measuring assembly 30 comprises a mounting rod 110, universal mounting clamp 112, support arm 114 and measuring device 116. Mounting rod 110 is preferably affixed to bushing 20 by threading into mounting opening 98 to connect measuring device 116 to bushing 20. Universal clamp 112 tightens around mounting rod 110 to leave a desired length of mounting rod 110 below universal clamp 112. Support arm 114 is slidably disposed through universal clamp 112 and tightened into place. Support arm 114 is affixed to, and may be integrally affixed to measuring device 116. Variations of the combination of mounting rod 110, support arm 114 and universal clamp 112 may be used. Measuring device 116 may be any device capable of measuring a differential distance between two surfaces. The embodiment shown depicts a back plunger indicator.

Figure 10:
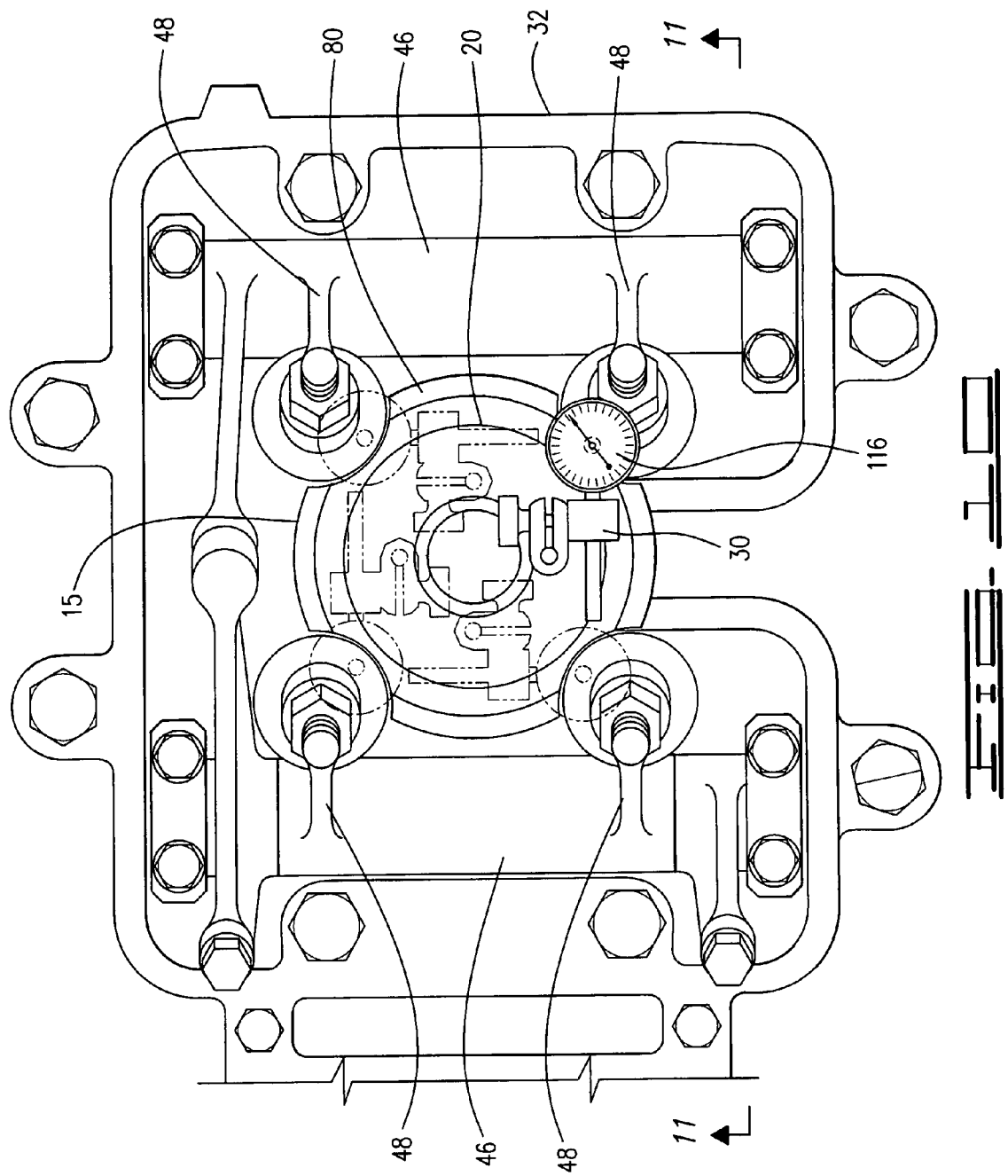
FIG. 10—Is a top view of a cylinder head with the cover removed, rocker arms still connected, and the valve recession measuring tool in place.

The method of operation of valve recession measuring tool 10 comprises removing a cylinder head cover (not shown) to expose the valves 34. Valve recession measuring tool 10 may be used with any number of cylinder head types, but is particularly useful with cylinder heads used in the VHP family of Waukesha engines. As depicted in FIGS. 10 and 11, cylinder head 32 has four valves 34. Rocker arm assemblies 46 are left in place, and measuring tool 10 is placed in its measuring position. Measuring tool 10 can only be placed in a proper measuring position, the 0° or 180° position, and therefore self positions, or automatically positions. Any spark plug wire is removed and spark plug 49, and any extension, will extend through central opening 86 in stem 25, and opening 100 in bushing 20. If desired, measuring tool 10 can be used without stem 25.

Bottom surface 52 of hub 15 will engage cylinder head surface 54 when measuring tool 10 is in place in its measuring position, so that reference plane 80 will be a constant. Bushing 20 is placed in inner well 56, and is rotatable relative to hub 15 and to reference plane 80. Mounting rod 110 is threaded to bushing 20, and universal clamp 112 is tightened thereon so that a tip end 118 of measuring device 116 will contact reference plane 80. Measuring device 116 may have an extender 120, so that tip 118 is on extender 120. Measuring device 116 may be positioned so that extender 120 is generally upright, or may be angled, but in either case, will be "zeroed" on reference plane 80. In other words, tip end 118 will be placed into contact with reference plane 80, and the readout on the measuring device 116 will be set to zero.

Bushing 20 is rotated relative to reference plane 80, and when tip 118 reaches a cutout 76, it is moved to engage a surface on valve 34, and determine a height, or distance relative to the reference plane 80. The distance will be readable from the gauge or back plunger indicator 116. The surface may be, for example, a valve spring retainer surface 44. Preferably, the surface on which the measurement is taken is higher or above reference plane 80 on hub 15 as viewed in FIG. 11. Bushing 20, along with measuring assembly 30, is rotated relative to the hub so that in the embodiment shown, a measurement is taken with respect to each valve 34, and in the example shown on valve spring retainer surface 44 of each valve 34. FIG. 10 shows in phantom lines measuring device 116 rotated and positioned to measure valve height for the three valves 34 other than the valve 34 over which the measuring device is placed in FIG. 10.

The initial measurement is preferably taken on a cylinder head 32 in an engine that has been operated for a short period of time, for example, two to three days. The first measurement is a base measurement. Each valve 34 can be identified, for example, as an intake or an exhaust valve and can be identified by which side of the center line 78 the valve 34 is on for purposes of record-keeping. Other record-keeping variations are likewise possible.

The cylinder head cover may be replaced after initial measurements are taken, and the engine operated for a period of time. At scheduled intervals, for example, sixty to ninety days or at scheduled shut-downs, measurements are taken and compared with the prior measurement. The difference between measurements will constitute the amount of valve recession 122 (see FIG. 12) into valve seat 37. Valve recession is an indicator that may be utilized for determining and predicting cylinder head life and a corresponding engine life. For example, a valve recession of 0.075 to 0.100 may constitute sufficient recession such that the cylinder head should be replaced. Such numbers are exemplary and the values may differ depending upon the cylinder head. The amount of valve recession is an indicator of when the cylinder may fail, and allows maintenance and/or replacement to be scheduled prior to the predicted failure of the cylinder, which if it occurs can be a catastrophic event. Generally, all of the cylinder heads in an engine will be replaced at once. Cylinder heads in an engine may be replaced once or twice but generally after cylinder heads have been replaced two times, the entire engine may be replaced or rebuilt.

As described herein, valve recession measuring tool 10 can accurately and repetitively measure valve height, and specifically the height or distance from a reference plane to a point on the valve. Measurements are taken, and valve recession is determined without removing rocker arm assemblies 46. Because rocker arm assemblies 46 are not removed, valuable time is saved. With prior art devices, such as the platform 5, rocker arm assemblies must be removed so the legs of the platform engage a cylinder head surface. For example, prior art tool 5 has platform surface 130 with legs 132 extending downwardly therefrom. Platform surface 130 is placed over valves 34 and legs 132 will engage a cylinder head 32. A measuring device 136 will rest upon platform surface 130, and extend through a slot 138 to engage an end of valve stem 36. Rocker arm assemblies and the cylinder head cover are then replaced. The process takes several hours during which the engine could be operating and personnel can be engaged in other tasks.

Thus, the present invention is well adapted to carry out the objects and attain the ends and advantages mentioned, as well as those inherent therein. While preferred embodiments of the present invention have been illustrated for the purpose of the present disclosure, changes in the arrangement and construction of parts and the performance of steps can be made by those skilled in the art, which changes are encompassed within the scope and spirit of the present invention as defined by the appended claims.

What is claimed is:

1. A valve height measuring tool comprising:
a center hub defining a reference plane; and
a measuring device rotatably mounted to the center hub for measuring a height of a plurality of valves in a cylinder head relative to the reference plane without repositioning the center hub.

2. The valve height measuring tool of claim 1, wherein the center hub is automatically positionable in a measuring position on the cylinder head.

3. The measuring tool of claim 1, wherein the height of the valves relative to the reference plane is measured from a valve spring retainer surface.

4. The measuring tool of claim 1, wherein the center hub further defines an outer periphery with arcuate cutouts therein through which the valves extend.

5. The measuring tool of claim 1, wherein the center hub has a bisecting center line with a plurality of cutouts on each side thereof, the plurality of cutouts providing a space for the valves to extend therethrough.

6. The measuring gauge tool of claim 1, further comprising:
a stem connected to the center hub, the center hub defining a cylindrical inner well; and
a bushing rotatably disposed in the cylindrical inner well, wherein the measuring device is rotatable with the bushing.

7. The valve height measuring tool of claim 6, wherein the stem is insertable in an opening in the cylinder head.

8. A valve recession measuring tool comprising:
a center hub defining a reference plane;
a measuring device rotatable relative to the center hub for measuring the height of valves in a cylinder head relative to the reference plane, wherein the center hub is automatically positionable in a measuring position on the cylinder head so that the height of each valve can be repetitively measured relative to the reference plane to establish a height change corresponding to valve recession without repositioning the center hub.

9. The measuring tool of claim 8, the center hub further comprising a periphery with a plurality of cutouts therein, wherein the valves of which the height is to be measured pass through the cutouts.

10. The tool of claim 8, wherein valve height relative to the reference plane is measured from a valve spring retainer surface.

11. The tool of claim 8, wherein the center hub may be placed in the measuring position and height measurements may be taken with a rocker arm assembly in place on the cylinder head.

12. The tool of claim 8, further comprising a bushing rotatably disposed in a cylindrical inner well defined by the center hub, the measuring device being connected to and rotatable with the bushing.

13. The tool of claim 12, wherein the measuring device is movable along the reference plane.

14. A valve height measuring tool comprising:
a hub defining a reference plane and a cylindrical inner well;
a bushing rotatably disposed in the cylindrical inner well; and
a measuring device connected to the bushing and rotatable therewith for measuring valve height relative to the reference plane; wherein
the hub is positionable in a measuring position on a cylinder head with valve rocker arm assemblies attached thereto, so that the measuring device can measure the height of each of a plurality of valves in the cylinder head relative to the reference plane without removing the hub from said cylinder head.

15. The measuring tool of claim 14, wherein the hub is automatically positionable in the measuring position.

16. The measuring tool of claim 14, further comprising a cylindrical stem connected to the hub and insertable into a spark plug opening in the cylinder head when the hub is in the measuring position.

17. The measuring tool of claim 14, the hub further comprising a periphery with a plurality of cutouts, wherein the valves pass through the cutouts and the measuring device contacts a surface on the valves.

18. The measuring tool of claim 14, wherein the bushing further comprises a shoulder with a diameter greater than a diameter of the cylindrical inner well of the hub, and wherein the measuring device is mounted to the shoulder.

19. The measuring tool of claim 14, wherein the height of the valve is measured from a surface defined on a valve spring retainer on the valve.

20. A method of determining valve recession in a cylinder head comprising the steps of:
   removing a cylinder head cover of an engine to expose a plurality of valves and a valve rocker arm assembly;
   positioning a measuring tool defining a reference plane in a measuring position on the cylinder head; and
   without removing the measuring tool from the cylinder head, measuring an initial distance between each of the valves and the reference plane without removing the valve rocker arm assembly.

21. The method of claim 20, further comprising:
   replacing the cylinder head cover;
   operating the engine for a period of time;
   removing the cylinder head cover;
   positioning the measuring tool defining a reference plane in a measuring position on the cylinder head;
   without removing the measuring tool from the cylinder head, measuring a second distance between each of the valves and the reference plane without removing the valve rocker arm assembly; and
   determining a recession of each valve by comparing the initial distance and the second distance.

22. The method of claim 20, wherein the distances are measured from a valve spring retainer surface.

23. The method of claim 20, wherein the measuring tool comprises a hub defining the reference plane, and a measuring device rotatable relative to the hub.

24. The method of claim 23, wherein the measuring step comprises
   establishing the reference plane as the "zero" point for the measuring device;
   rotating a measuring device along the reference plane to a cutout in the reference plane through which the valve extends; and
   moving the measuring device to contact a surface on the valve.

25. The method of claim 24, wherein the surface on the valve is on a valve spring retainer.

* * * * *